No. 857,164. PATENTED JUNE 18, 1907.
P. EDTBAUER.
AUTOMATIC WEIGHING DEVICE.
APPLICATION FILED DEC. 24, 1906.

3 SHEETS—SHEET 1.

Witnesses:

Inventor,
Petronella Edtbauer,
by Frank D. Thomason
Atty.

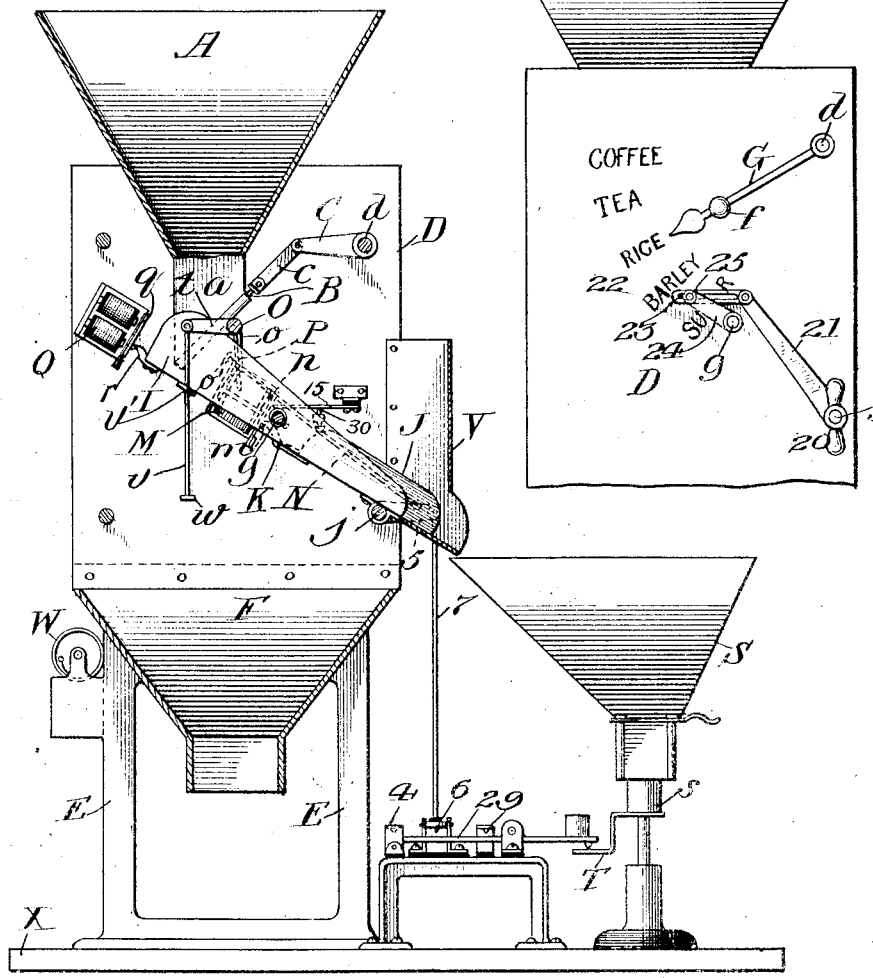

No. 857,164. PATENTED JUNE 18, 1907.
P. EDTBAUER.
AUTOMATIC WEIGHING DEVICE.
APPLICATION FILED DEC. 24, 1906.
3 SHEETS—SHEET 3.
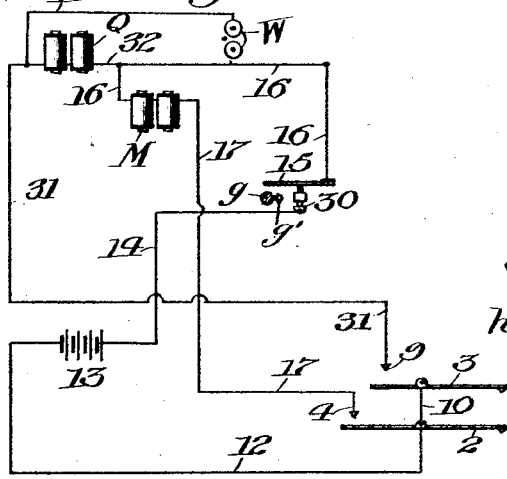
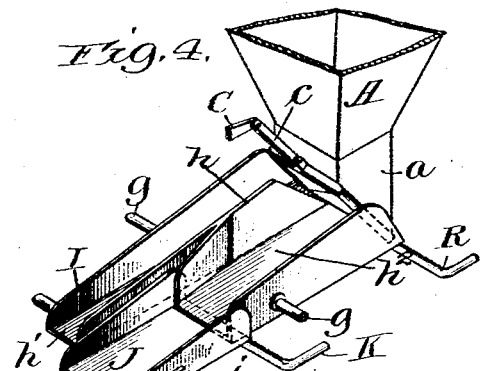
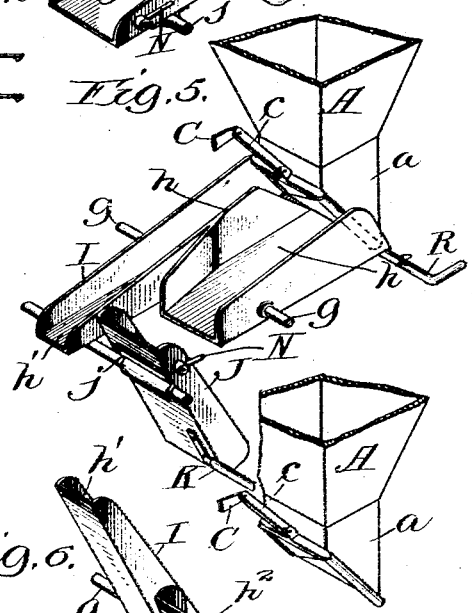
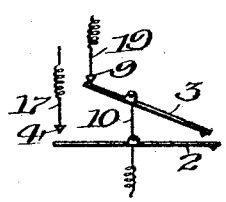
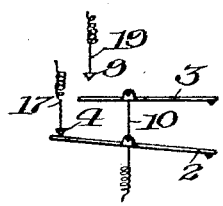
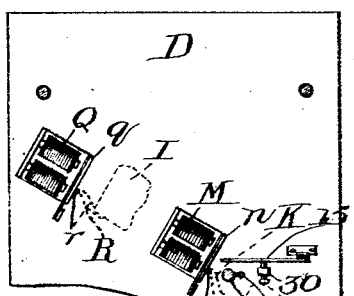
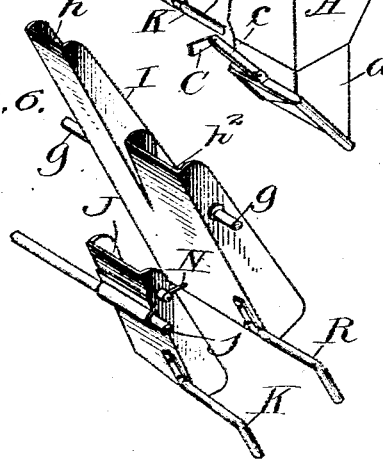
Witnesses:
O. M. Heinick
E. K. Lundy.
Inventor.
Petronella Edtbauer,
by Frank D. Thomason
Atty

UNITED STATES PATENT OFFICE.

PETRONELLA EDTBAUER, OF CHICAGO, ILLINOIS.

AUTOMATIC WEIGHING DEVICE.

No. 857,164.      Specification of Letters Patent.      Patented June 18, 1907.

Application filed December 24, 1906. Serial No. 349,209.

*To all whom it may concern:*

Be it known that I, PETRONELLA EDTBAUER, a citizen of the United States, and a resident of Chicago, in the county of Cook and State of Illinois, have invented certain new and useful Improvements in Automatic Weighing Devices for Store Service, of which the following is a clear, full, and exact description.

The object of my invention is to provide a contrivance for automatically weighing the exact quantity desired of any free flowing commodity on the weighing scales used for store service, and prevent the possibility of incorrect weight being given either by inexperienced or unreliable persons. This I accomplish by mechanism, into the hopper of which the commodity to be sold is deposited, and which, when the scales receive the exact quantity desired, automatically dumps the excess thereof back into the scoop or other suitable receptacle, by means of which latter it can be returned to its original place of storage, substantially as hereinafter fully described, and as particularly pointed out in the claims.

Figure 1:
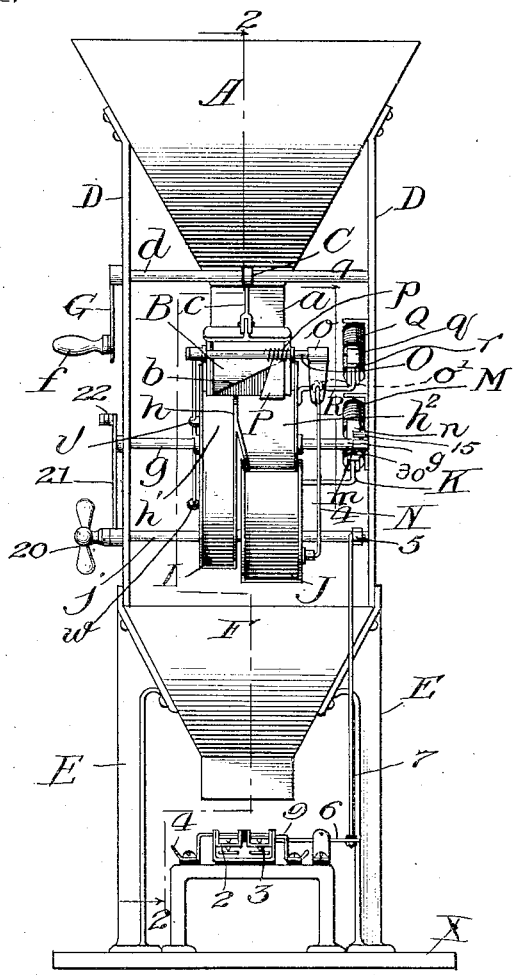
Figure 7:
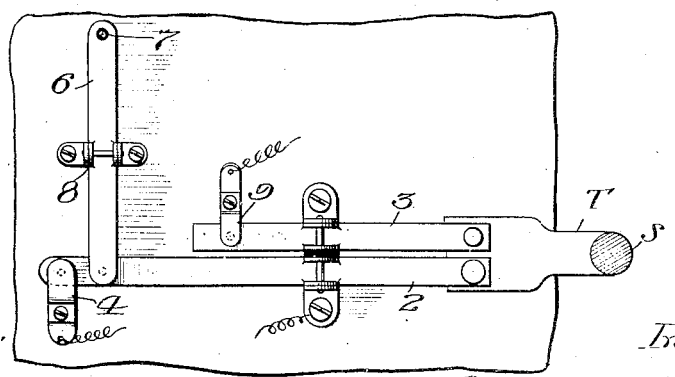

In the drawings:—Figure 1 is a front elevation of my invention. Fig. 2 is a vertical section therethrough taken on dotted line 2—2, Fig. 1. Fig. 3 is a side elevation of the upper portion of said invention showing the relation of the devices thereon when the chutes are in a tilted position. Figs. 4, 5 and 6 are detail views showing, in perspective, the chutes, and the different positions assumed by the same during the operation of the machine. Fig. 7 is a detail view showing a plan of the devices for electrically connecting my invention with the weighing scales. Figs. 8, 9, and 10 are diagrammatical views of the electrical circuits used in connection with my invention. Fig. 11 is a vertical transverse section taken on dotted line 4, 4, Fig. 1 of the said upper portion of the same.

In the drawings A represents a hopper, preferably, of an inverted truncated pyramidal shape, which is provided with a short tubular extension $a$ depending from its lower end, that is rectangular in cross section and has the opposite side edges of its lower open end inclined, so that the front edge of said opening is considerably higher than the rear edge thereof. These inclined side edges are provided with guide-ways for the side edges of the longitudinally reciprocal gate B, the lower edge $b$ of which latter is oblique to its length. At about its center of length the upper edge of this gate is provided with lugs, between which the lower end of a link $c$ is pivoted, that connects said gate with an arm C secured to and projecting from a transverse rock-shaft $d$, journaled in bearings in the sides of the supporting-frame of the machine, substantially as shown.

Hopper A is suitably supported between the upper ends of substantially corresponding side-walls D. These side-walls may, if desired, be supported by legs or standards E arising from the base-plate X of the machine, and their lower edges can rest upon the upper side edges of a funnel F, as shown, but I do not want to be confined to any particular construction of said side-frames or the framework of the machine, as this may be changed to suit the fancy of the designer or manufacturer without departing from the spirit of my invention. The space between the standards E, E, below the funnel F, is sufficient to permit of any suitable receptacle being placed thereunder to receive the excess commodity passing through the machine, as will hereinafter be more fully explained.

One end of rock-shaft $d$ extends through its bearings and is provided with an index hand G, which latter can be moved, by means of a suitable finger-grasp $f$, to indicate the commodity being passed through the machine. The names of these commodities are arranged on the outer surface of the side-wall D, concentric to shaft $d$, in such order and at such distances apart, that, when the hand is moved to indicate a given commodity, it will cause the gate B to open the discharge opening of hopper A, just sufficient to permit of a graduated or measured flow of the commodity so indicated into the chutes. The chutes just referred to consist of a large chute I, and a small chute J used in connection therewith. Chute I is fulcrumed at about its center of length to the walls D, D, of the supporting-frame by trunnions $g$ and is provided with a longitudinal vertical wall $h$, which extends practically its entire length and divides the chute into a narrow passage $h'$, and a passage $h^2$ about twice the width of said narrow passage. The floor of the wider passage, $h^2$, is cut away, back from the lower end of the chute, a distance corresponding to about one-third the length of the chute, thus practically making the wider passage of said chute considerably shorter than the narrower passage. The smaller chute J is secured near its lower end in a normally inclined position to a transverse rock-shaft $j$, and it is of such width and is so arranged that its upper end incloses the lower end of the wider passages $h^2$ of chute I. Its length is substantially equal to the lower half of chute I, and, in its normal position, it forms a continuation of the wider passage of said chute, I, and assists the flow of the commodity, during the initial flow of the same, to the pan of the scales. This smaller chute J is designed to tilt at the proper time into an inclined position just the opposite of that in which it is in at the commencement of the operation of the machine, and then directs the flow of the commodity after it has passed through chute I, into funnel F.

A connecting-rod N connects the side-wall of the lower end of chute J with an arm $o$ depending from a transverse rock-shaft O, which latter is journaled in bearings connected to and projecting from the sides of the extension $a$ of hopper A. Between its bearings shaft O is provided with a vane P, which depends down therefrom in front of the larger end of the discharge-opening of the hopper, against which it is kept normally pressing by a coil-spring $p$ wound upon shaft O, with one end attached thereto and the other end extended upward and bearing against the gate B. The connecting-rod N is not pivoted to arm $o$, but extends through an opening therein and has a button or head $o'$ thereon, which prevents its disengaging from said arm $o$. When the chutes are in the position shown in Fig. 2 of the drawings, as at the commencement of the operation of the machine, the button of the end of said rod N engages said arm and holds the shaft O in such position that the vane P will be removed from the discharge-opening of the hopper, but, when the smaller chute J tilts so as to dump whatever flows into it into the funnel F, the rod moves longitudinally upward through the opening in arms $o$, and the shaft, through the agency of spring $p$, moves so as to make vane P close the larger end of the discharge-opening and slows up the flow of the commodity from the hopper.

The end of shaft O opposite that from which arm $o$ depends, is provided with an arm $t$ projecting to the rear, to the extremity of which a rod $v$ is pivotally connected. This rod extends down through an eye $v'$ projecting transversely from the bottom of chute I near the upper end thereof and has a button or head $w$ on its lower end. The purpose of this rod $v$ is to enable the larger chute, when it tilts so as to discharge direct into funnel, F, to engage the head $w$ thereof and cause the rod $v$ to turn shaft O so as to move vane P away from the discharge-opening of the hopper in order that its contents can be more quickly emptied. When the smaller chute is restored to its original position, rod N, through the medium of arm $o$ and shaft O holds the vane away from the discharge opening of the hopper until it again tilts and discharges into funnel F.

Projecting laterally from the underside of the chute J near its upper end is a pawl K, which extends to and is engaged by a detent $m$ projecting from a suitable armature $n$ of the magnets M. It is only when this magnet M is energized and the armature $n$ thereof attracted thereby, and moves the detent $m$ away from pawl K, that the chute J will fall into the position shown in Fig. 5 of the drawings. By restricting the flow of the commodity from the hopper A by the use of the vane P, the remaining contents will discharge from the hopper slower than before, and enable the flow through the narrower channel of said chute J to continue longer, and thus insure the continuation of said flow until the proper measure of the commodity has fallen into the pan of the scales. After chute J has tilted so as to dump its contents into the funnel, magnet M becomes demagnetized, and when the continued flow of the commodity through the narrower passage of chute I has supplied the desired weight in the pan of the scales, a magnet Q becomes magnetized and attracts a flat armature $q$. This armature $q$ has a detent $r$ projecting from its back, and when this detent withdraws its support from under the end of an arm R projecting from the upper end of chute I, said chute falls and tilts into the position shown in Fig. 6 of the drawings.

The weighing scales, in connection with which my improvements are used, may be of any of the styles now in common use. The one shown in the drawings is of the type comprising a balance-beam $s$ having a weight-platform (not shown) at one end, and a removable pan or scoop S of any suitable design on its other end into which the commodity being weighed flows. The end of beam $s$ supporting the pan S has an arm T secured thereto, which, preferably, projects laterally therefrom toward the said feeding devices. When the machine is set for operation, the weighted ends of switches 2 and 3 rest on the adjacent end of this arm T. These switches each comprise rocking-beams or levers, which are fulcrumed at suitable points mediate their ends, between standards arising from a raised platform. The portion of these switches between their fulcrums and their weighted ends are substantially the same length, but the length of the opposite end portion of switch 2 is longer, preferably, than the opposite end portion of switch 3. When the pan S of the scales receives a sufficient quantity of the commodity to cause it to move downward slightly, switch 2 moves so that its upwardly moving end engages the terminal 4 of an electric circuit and completes a circuit through magnet M, and, in the manner hereinbefore explained, causes chute J to tilt into the position shown in Fig. 5 of the drawings. Chute J in tilting moves rock-shaft $j$. This rock-shaft has an arm 5, which is connected to one end of a lever 6 by a link 7, and this lever 6 is fulcrumed between standards 8, 8, arising from the same platform, and is arranged at right angles to switch 2, and so that the end thereof opposite to which link 7 is connected extends over switch 2. Now immediately after chute J tilts, as shown in Fig. 6 of the drawings, lever 6 is moved so that it presses down upon switch 2 and breaks the contact between terminal 4 and said lever and opens the circuit again in which magnet M is in. When the pan S of the scales has received a sufficient quantity of the commodity to obtain the weight desired, and moves down to the limit of its movement, switch 3, whose weighted end had previously been supported by arm T, is rocked to an extent further than it is necessary to move switch 2 to enable its end farthest from said scales to come in contact with the terminal 9 of an electric circuit in which magnet Q is included, and energizes the same, with the results hereinbefore specified, and at the same time rings a bell W, secured in any desired position to the supporting-frame, to signify that the weighing operation of the scales has been accomplished.

In Fig. 8 of the drawings I show a diagrammatical view of the electric circuits used in my invention. In this the fulcrum of switches 2 and 3 are shown to be electrically connected by a wire 10, and the fulcrum of switch 2 to be connected by a wire 12 to a battery 13. From the opposite electrode of battery 13 a wire 14 extends to and is connected with a suitable contact-point 30, which latter is normally engaged by a circuit breaker 15, consisting of a strip of elastic metal permanently secured at one end and bearing down upon said contact 30. From this circuit-breaker a wire 16 extends to magnet M and from thence a wire 17 extends back to terminal 4, substantially as shown in Fig. 10 of the drawings. Switch 3 does not electrically contact with terminal 9 at the same time switch 2 engages terminal 4, or vice versa, but when switch 3 does engage terminal 9, the circuit is established through wires 10 and 12 to battery 13, and from thence through wire 14 to contact 30, and then through the circuit-breaker 15 and a portion of wire 16 and a wire 32 to the magnets Q, and finally from the magnets Q through a wire 31 back to contact 9. A bell-circuit wire 19 is provided the ends of which are connected and always closed to wires 16 and 31, and an electric bell W is electrically connected thereto, which rings whenever magnets Q are energized. The manner in which the circuit caused by the initial movement of switch 2 is broken has been hereinbefore fully explained. In order, however, to break the circuit caused by the engagement of switch 3 with contact 9 the moment the weighing is completed and chute I tilts, I provide one of its trunnions $g$ with a short projecting stud $g'$, which, when chute I is in the position shown in Fig. 2 will project horizontally forward, as shown in Fig. 11 of the drawings. Now when said chute, I, tilts to the position shown in Fig. 6, the turning of the trunnion $g$ causes said stud, $g'$, to engage and push the free end of circuit-breaker 15 upward out of contact with contact 30, and instantly breaks the circuit. The circuit-breaker 15 and stud $g'$ remains in this last mentioned position until the chutes are raised again, and, when this happens, the trunnion $g$ and stud $g'$ resume their original positions, and permit the circuit-breaker to press down on contact 30 again.

In order to carry the direct flow of the commodity from the chutes I and J to the pan of the scales I have provided a stationary chute or incline V the sides of which are upturned and connected to the side-walls D, D, of the supporting-frame. This incline may be dispensed with, if desired. It is not shown in Fig. 1 of the drawings as its presence there would obscure the mechanism back of it.

In order to restore the two chutes I and J to their original or first positions, I extend one end of shaft $j$ beyond its bearings and attach a hand-grasp 20, and also an upwardly projecting arm 21. The arm 21 extends a short distance above the bearing of the adjacent end of one of the trunnions $g$ of the chute I and has pivotally connected thereto a link 22, having a longitudinal slot 23 extending nearly its entire length, and I provide the adjacent end of said trunnion $g$ with an arm 24 having a wrist-pin 25 which extends through the slot 23. When the chute I tilts into the position shown in Fig. 6 of the drawings, the wrist-pin will move to near the forward end of the slot 23 that is nearest arm 21, so that by manipulating hand-grasp 20 to restore the shaft $j$ and the chute J to their original positions, chute I, through the medium of the arm 24 and trunnions $g$, will be restored to its original position, substantially as shown in Fig. 4 of the drawings.

The operation of my invention is substantially as follows: The weight on the end of switch 2 is normally supported by the arm T projecting from the end of the balance-beam supporting the pan S. When said pan has received enough of the commodity so that, together with the weighted end of switch 2 it will cause the pan to move downward, the movement of switch 2 closes the circuit and energizes the magnet M, and releases the chute J so that it tilts and discharges into funnel F, almost at the same time the rock-shaft $j$, through the medium of arm 5 and link 7 causes the lever 6 to move switch 2 away from contact 4 and break the circuit and lifts its opposite weighted end from arm T. Thus relieved of said weight, the pan of the scales rises to the upper limit of its movement again and continues in this position until sufficient of the commodity has flowed through the smaller passage of chute I to equal the weights on the platform at the other end of the balance-beam of the scales, whereupon said pan moves down to the limit of its lower movement, and the support of arm T is withdrawn from the adjacent weighted end of switch 3, and the switch moves so as to close the circuit that includes the magnet Q and results in the immediate tilting of the larger chute I, and the consequent discharge of the commodity flowing from the hopper into funnel F. The next time it is desired to use the machine the chutes are restored to their original position.

What I claim as new is:—

1. An automatic feed mechanism for weighing devices comprising a suitable hopper, an inclined chute having two longitudinal channels and fulcrumed below said hopper and tiltable to change the direction of flow of the commodity; balance scales at the end of said chute farthest from said hopper and means for directing the flow through one of said channels away from said scales.

2. An automatic feed mechanism for weighing devices comprising a suitable hopper, an inclined chute having two longitudinal channels one of which is wider than the other and fulcrumed below said hopper and tiltable to change the direction of flow of the commodity; balance scales at the end of said chute farthest from said hopper and means for directing the flow through one of said channels away from said scales.

3. An automatic feed mechanism for weighing devices comprising a suitable hopper, an inclined chute having two longitudinal channels one of which is wider and shorter than the other and fulcrumed below said hopper and tiltable to change the direction of flow of the commodity; balance scales at the end of said chute farthest from said hopper and a short tilting chute for receiving and directing the flow away from said scales through the broader channel independently of the longer narrow channel.

4. An automatic feed mechanism for weighing devices comprising a suitable hopper, an inclined chute having two longitudinal channels and fulcrumed below said hopper and tiltable to change the direction of flow of the commodity; balance scales at the end of said chute farthest from said hopper, means for directing the flow through one of said channels away from said scales, and a funnel below said hopper adapted to receive from said chute the excess flow of said hopper.

5. An automatic feed mechanism for weighing devices comprising a suitable hopper, an inclined chute having two longitudinal channels one of which is wider than the other and fulcrumed below said hopper and tiltable to change the direction of flow of the commodity; balance scales at the end of said chute farthest from said hopper, means for directing the flow through one of said channels away from said scales, and a funnel below said hopper adapted to receive from said chute the excess flow of said hopper.

6. An automatic feed mechanism for weighing devices comprising a suitable hopper, an inclined chute having two longitudinal channels one of which is wider and shorter than the other and fulcrumed below said hopper and tiltable to change the direction of flow of the commodity; balance scales at the end of said chute, a short tilting chute for receiving and directing the flow away from said scales through the broader channel independently of the longer narrow channel, and a funnel below said hopper adapted to receive from said chute the excess flow of said hopper.

7. An automatic feed mechanism for weighing devices comprising a suitable hopper, an inclined tilting chute fulcrumed below said hopper and temporarily supported at one end, electrically controlled devices for releasing the supported end of said tilting chute, and balance scales at the end of said chute farthest from said hopper which are electrically connected to said releasing devices.

8. An automatic feed mechanism for weighing devices comprising a suitable hopper, an inclined tilting chute temporarily supported at one end having two longitudinal channels and fulcrumed below said hopper, balance scales at the end of said chute farthest from said hopper which are electrically connected to releasing devices, means for directing the flow through one of said channels away from said scales and electrically controlled releasing devices for said tilting chute and for said directing means.

9. An automatic feed mechanism for weighing devices comprising a suitable hopper, an inclined tilting chute temporarily supported at one end having two longitudinal channels one of which is wider than the other and fulcrumed below said hopper, balance scales at the end of said chute farthest from said hopper which are electrically connected to releasing devices, means for directing the flow through one of said channels away from said scales and electrically controlled releasing devices for said tilting chute and for said directing means.

10. An automatic feed mechanism for weighing devices comprising a suitable hopper, an inclined tilting chute temporarily supported at one end having two longitudinal channels one of which is wider and shorter than the other and fulcrumed below said hopper, balance scales at the end of said chute farthest from said hopper which are electrically connected to releasing devices, a short tilting chute for receiving and directing the flow away from said scales through the broader channel independently of the longer narrow channel, and electrically controlled releasing devices for said tilting chute.

11. An automatic feed mechanism for weighing devices comprising a suitable hopper, an inclined tilting chute temporarily supported at one end having two longitudinal channels one of which is wider and shorter than the other and fulcrumed below said hopper, balance scales at the end of said chute farthest from said hopper which are electrically connected to releasing devices, a short tilting chute for receiving and directing the flow away from said scales through the broader channel independently of the longer narrow channel and independently electrically controlled releasing devices for each of said tilting chutes.

12. An automatic feed mechanism for weighing devices comprising a suitable hopper, an inclined tilting chute temporarily supported at one end having two longitudinal channels one of which is wider and shorter than the other and fulcrumed below said hopper, balance scales at the end of said chute farthest from said hopper, which are electrically connected to releasing devices, a short tilting chute for receiving and directing the flow away from said scales through the broader channel independently of the longer narrow channel, and independently electrically controlled consecutively operated releasing devices for each of said tilting chutes.

13. An automatic feed mechanism for weighing devices comprising a suitable hopper, an inclined tilting chute having two longitudinal channels one of which is wider and shorter than the other and fulcrumed below said hopper, balance scales at the end of said chute farthest from said hopper; a lever of the first class for tilting said short chute; magnets for actuating said lever, an electric circuit electrically connecting said scales and magnets, and a short tilting chute for receiving and directing the flow away from said scales through the broader channel independently of the longer narrow channel.

14. An automatic feed mechanism for weighing devices comprising a suitable hopper, an inclined tilting chute fulcrumed below and at one side of said hopper, a rockshaft to which said hopper is secured mediate its ends, a pawl projecting therefrom, an armature engaged by said pawl, magnets therefor, balance scales at the end of said chute farthest from said hopper, and an electric circuit connecting said balance scales and magnets.

15. An automatic feed mechanism for weighing devices comprising a suitable hopper, an inclined tilting chute having two longitudinal channels which are fulcrumed below and at one side of said hopper, a rockshaft to which said chute is secured, balance scales at the end of the chute farthest from said hopper, a short tilting chute for receiving and directing the flow through one of said channels away from said scales, a rockshaft to which said short tilting chute is secured, and means for connecting said rockshafts which permit the latter to tilt independently of the former but makes both return simultaneously.

16. An automatic feed mechanism for weighing devices comprising a suitable hopper, an inclined tilting chute having two longitudinal channels which are fulcrumed below said hopper, a rock-shaft to which said chute is secured, balance scales at the end of the chute farthest from said hopper, a short tilting chute for receiving and directing the flow through one of said channels away from said scales, both of said tilting chutes temporarily supported at one end, a rock-shaft to which said short tilting chute is secured, means for connecting said rock-shafts which permit the latter to tilt independently of the former but makes both return simultaneously, and electrical means dependent upon said scales for releasing first the short tilting chute and then the other.

17. An automatic feed mechanism for weighing devices comprising a suitable hopper, an inclined tilting chute having two longitudinal channels and fulcrumed below said hopper, balance scales at the end of said chute farthest from said hopper, means for directing the flow through one of said channels away from said scales, and a suitable automatic device for restricting the discharge from said hopper.

18. An automatic feed mechanism for weighing devices comprising a suitable hopper, an inclined tilting chute having two longitudinal channels one of which is wider than the other and fulcrumed below said hopper, balance scales at the end of said chute farthest from said hopper, means for directing the flow through one of said channels away from said scales, and a suitable automatic device for restricting the discharge from said hopper.

19. An automatic feed mechanism for weighing devices comprising a suitable hopper, an inclined tilting chute having two longitudinal channels one of which is wider and shorter than the other and fulcrumed below said hopper, balance scales at the end of said chute farthest from said hopper, a short tilting chute for receiving and directing the flow away from said scales through the broader channel independently of the longer narrow channel, and a suitable automatic device for restricting the discharge from said hopper.

20. An automatic feed mechanism for weighing devices comprising a suitable hopper, an inclined tilting chute having two longitudinal channels fulcrumed below said hopper, balance scales at the end of said chute farthest from said hopper, means for directing the flow through one of said channels away from said scales and a suitable automatic swinging device for restricting the discharge from said hopper.

21. An automatic feeding machine for weighing scales comprising a suitable hopper, an adjustable gate for regulating the discharge opening thereof, an inclined tilting chute fulcrumed below said hopper, a suitable automatic device independent of said gate for restricting the discharge from said hopper, and balance scales at the end of said chute farthest from said hopper.

22. An automatic feeding machine for weighing scales comprising a suitable hopper, an adjustable gate for regulating the discharge opening thereof, an inclined tilting chute fulcrumed below said hopper, a suitable automatic swinging device independent of said gate for restricting the discharge from said hopper, and balance scales at the end of said chute farthest from said hopper.

23. An automatic feed mechanism for weighing devices comprising a suitable hopper, a sliding gate therefor, a rock-shaft, a link connecting said rock-shaft and gate, an index arm secured to the extended arm of said shaft, an inclined tilting chute fulcrumed below said hopper, and balance scales at the end of said chute farthest from said hopper.

24. An automatic feed mechanism for weighing devices comprising a suitable hopper, a sliding gate therefor, a rock-shaft, a link connecting said rock-shaft and gate, an index arm secured to the extended arm of said shaft, indicia adjacent to said index arm indicating the extent of closure of the discharge opening of said hopper, an inclined tilting chute fulcrumed below said hopper, and balance scales at the end of said chute farthest from said hopper.

25. An automatic feed mechanism for weighing devices comprising a suitable hopper, a sliding gate for regulating the discharge opening thereof, indicia indicating the relative position of said gate, means operatively connected to said gate provided with an index arm for indicating an item enumerated in said indicia according to the extent of closure of the discharge opening of said hopper, an inclined tilting chute fulcrumed below said hopper, and balance scales at the end of said chute farthest from said hopper.

In testimony whereof I have hereunto set my hand and seal this 17th day of December, A. D., 1906.

PETRONELLA EDTBAUER. [L. S.]

Witnesses:
FRANK D. THOMASON,
E. K. LUNDY.